UNITED STATES PATENT OFFICE.

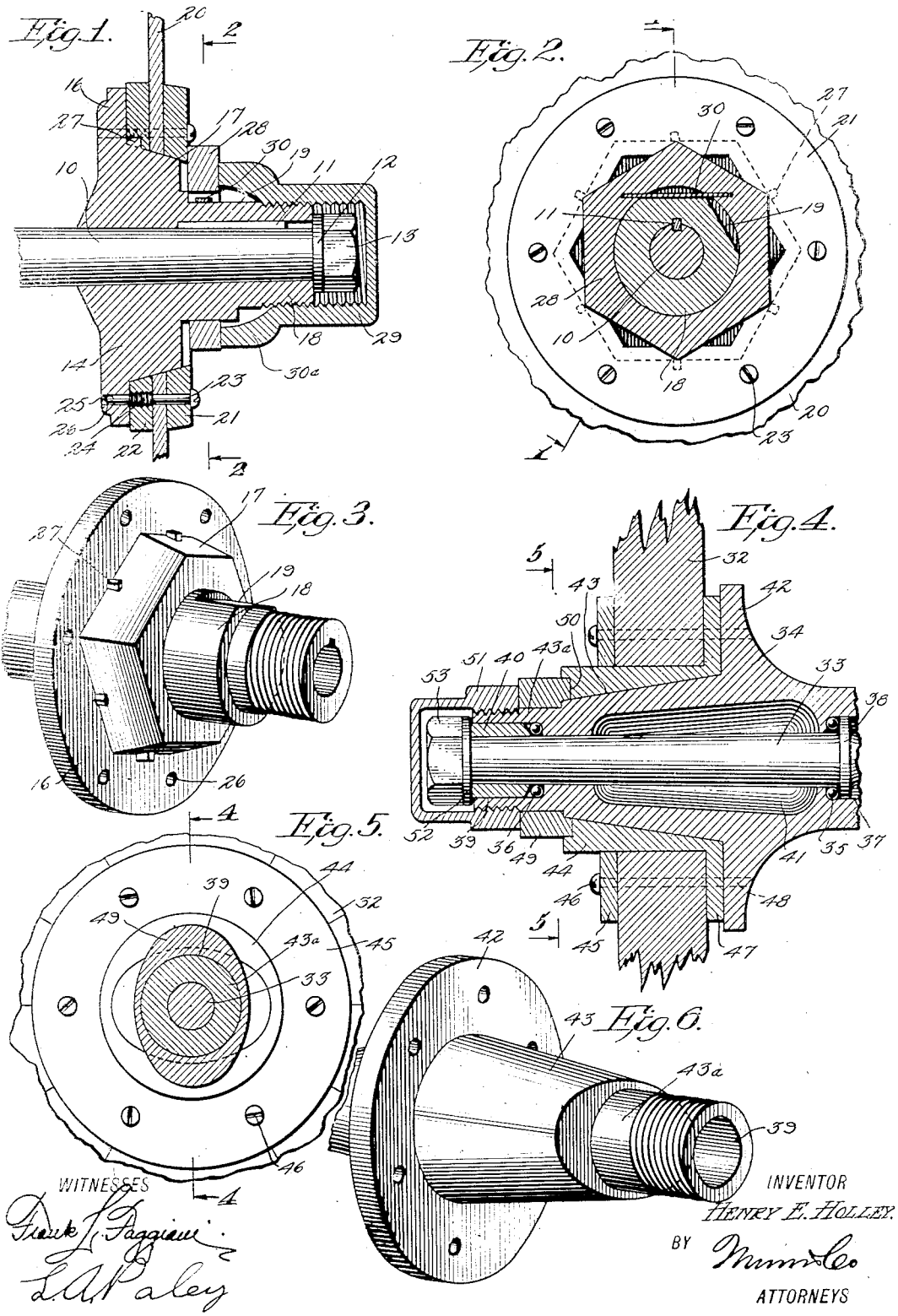

HENRY EASTON HOLLEY, OF OTISVILLE, NEW YORK.

DEMOUNTABLE WHEEL.

1,398,020.   Specification of Letters Patent.   Patented Nov. 22, 1921.

Application filed December 29, 1919. Serial No. 347,930.

*To all whom it may concern:*

Be it known that I, HENRY E. HOLLEY, a citizen of the United States, and a resident of Otisville, county of Orange, and State of New York, have invented a new and Improved Demountable Wheel, of which the following is a full, clear, and exact description.

This invention relates to demountable wheels, and has reference more particularly to a demountable wheel provided with an irregularly shaped hub which is fitted to a rim-bearing member.

An object of this invention is to provide a demountable wheel which will be cheap to construct, and which may be easily and quickly removed from the hub.

Reference is to be had to the accompanying drawing forming a part of this specification in which it is understood that the drawing is merely illustrative of one example of the invention together with certain modifications, and in which—

Figure 1 is a central, sectional view on the line 1—1 of Fig. 2 through one form of my demountable wheel specially adapted to the rear axle of a vehicle.

Fig. 2 is a section through Fig. 1 on the line 2—2.

Fig. 3 is a perspective view of the hub of my improved demountable wheel.

Fig. 4 is a sectional view through Fig. 5 on the line 4—4 showing a modified form of my demountable rim adapted to a front axle.

Fig. 5 is a section through Fig. 4 on the line 5—5.

Fig. 6 is a perspective view of the hub of the wheel shown in Fig. 5.

Referring to the accompanying drawing by numerals, 10 indicates a rear axle of any vehicle such as an automobile on which is secured by means of a key 11, a washer 12, and a nut 13, a hub 14. The hub 14 has threee distinct sections, the first of which is an annular flange 16; the second is a frusto-pyramidal section 17 having a hexagonal or other polygonal base; and the third section 18 is substantially cylindrical but is provided with two chordal plane surfaces 19 extending parallel to the axis of said hub. This form of demountable wheel is specially adapted for use with a wheel having a disk 20 to support the rim rather than the spokes, and said disk is preferably secured between two supporting members 21 and 22 by means of a plurality of bolts 23. The members 21 and 22 and the disk 20 when fixed together by the bolts 23 have an internal shape similar to the section 17 of the hub 14 so that the two register. The bolts 23 are loosely fitted in the supporting member 21 and the disk 20, but has a threaded portion 24 which engages similar threads on the supporting member 22. The bolts 23 also have dowel-like ends 25 which register with holes 26 in the flange 16, said ends forming auxiliary locking means to prevent the rotation of the disk 20 around the hub 14. A lug 27 is also formed on each face of the section 17, said lugs engaging similarly shaped grooves in the supporting member 22 so that said lugs will also assist in preventing rotation of the disk 20 about the hub 14.

A washer 28 is rotatably mounted on the section 18 and has an outside shape substantially that of the outer end of the section 17 and the support 21 so that when the points of said washer are turned so as to engage the flats of the support 21, the disk 20 will be locked onto the hub 14, but when said washer 28 is turned so that its shape registers exactly with the shape of the member 21, the disk 20 may be removed by sliding it outwardly over the washer 28. In order to hold the washer 28 securely against the outer surface of the member 21, the outer end of the section 18 is threaded to receive a cap 29, said cap having a portion 30ª larger in diameter than the section 18, said portion engaging the washer 28 securely when the wheel is locked to the hub 14. The outer end of the cap 29 may be provided with flats not shown so that a wrench may be applied to screw or unscrew said cap on the section 18. When it is desired to remove the wheel from the hub 14, said cap is loosened slightly so that the washer 28 may be rotated about the section 18 until it registers with the opening in the supporting member 21, and when the wheel may be slipped out over said washer 28 and the cap 29. In order to secure the washer 28 in either a locked or unlocked position, a flat spring 30 is chordally fixed to the inside of said washer so as to engage either of the surfaces 19. When the washer 28 is rotated about the section 18, this spring 30 will bend up and allow the point between the faces 19 to pass under said spring.

In the form shown in Fig. 4, Fig. 1 is somewhat modified to utliize a wheel having wooden spokes 32. The hub 34 is also formed in three sections. the first being an annular flange 42, the second being a section having an outer surface 43 which is cylindrical adjacent the flange 42 and elliptical on the end opposite said flange, and a third section 43ª which is cylindrical. A collar 44 has an inner shape similar to the surface 43 and an outer cylindrical surface on which is mounted a ring 45 through which passes bolts 46 which are screwed to an annular flange 47 on the collar 44, thus securing the spokes 32 between said flange 47 and the ring 45. These bolts 46 are constructed similar to the bolts 23 and have dowel-like ends 48 which engage holes in the flange 42 thus providing auxiliary locking means to prevent the wheel from rotating about the hub 34. A washer 49 is rotatably mounted on the section 43ª and has an outer elliptical shape similar to the outer end of the surface 43. Thus when the washer 49 is in the position shown in Fig. 5, the collar 44 is locked on to the hub 34, but when this washer is rotated about the section 43ª at right angles to the aforementioned position, the ring 45 bearing the wheel may be withdrawn from the hub 34 over said washer. In the position shown in Fig. 5, the washer 49 sets in a recess 50 so that in order to be turned to a position at right angles to the aforementioned position it must be moved axially from said recess before being rotated on said section 43ª. In order to secure the washer 49 in the recess 50, and also to secure the collar 44 on the hub 34, the outer end of the section 43ª is threaded to receive a cap 51, the inner end of said cap bearing against the washer 49, and the outer end of said cap being provided preferably with flats not shown to engage a wrench. A washer 52 is interposed between the collar 40 and a nut 53, so that the hub 34 is held securely on the axle 33 and said cap 51 is of such size as to contain said nut 53.

It is understood that any of the forms may be used on either the front or rear axle by suitably modifying the hub but in each form, the rim bearing member is interchangeable between any of the wheels as it fits the hub whether said hub is modified to fit a rear or a front axle.

I would state in conclusion that while the illustrated example constitutes a practical embodiment of the invention, I do not limit myself strictly to the mechanical details herein illustrated since manifestly the same can be considerably varied without departure from the spirit of the invention as defined in the appended claims.

Having thus described my invention, I claim as new and desire to secure by Letters Patent:

1. A demountable wheel structure comprising a non-circular hub section carried by the axle, an abutment flange at its inner side, a reduced axial extension projecting from the opposite side thereof, a rotary non-circular member carried by said extension and capable of circumferential adjustment thereon to respectively bring the same into or out of registration with said hub section, a removable hub section carried by the wheel and having a non-circular bore conforming to the shape of the permanent hub section, said removable hub section being capable of application to or removal from the permanent section when the rotary member is registered therewith and adapted to be retained thereon by said member when the same is out of registration with said permanent section.

2. A demountable wheel structure comprising a non-circular hub section carried by the axle, an abutment flange at its inner side, a reduced axial extension projecting from the opposite side thereof, a rotary non-circular member carried by said extension and capable of circumferential adjustment thereon to respectively bring the same into or out of registration with said hub section, a removable hub section carried by the wheel and having a non-circular bore conforming to the shape of the permanent hub section, said removable hub section being capable of application to or removal from the permanent section when the rotary member is registered therewith and adapted to be retained thereon by said member when the same is out of registration with said permanent section, and means for locking said member in its circular adjusted positions comprising flattened angularly disposed faces on the periphery of the extension, and a resilient tongue secured within the bore of the rotary member intersecting the same and adapted to coact with said faces.

3. A demountable wheel structure comprising a non-circular hub section carried by the axle, an abutment flange at its inner side, a reduced axial extension projecting from the opposite side thereof, a rotary non-circular member carried by said extension and capable of circumferential adjustment thereon to respectively bring the same into or out of registration with said hub section, means for locking said member in its circumferentially adjusted positions, and a removable hub section carried by the wheel and having a non-circular bore conforming to the shape of the first hub section, said removable hub section being capable of application to or removal from the permanent section when the rotary member is registered therewith and adapted to be retained thereon by said member when the same is out of registration with the first section.

4. In a demountable wheel structure, a non-circular taper-sided hub section carried by the axle, an abutment flange at its enlarged inner side, a reduced axial extension projecting from the opposite side, a rotary non-circular member conforming to the shape and size of the outer reduced end of said hub section carried by said extension and capable of circumferential adjustment thereon to respectively bring the same into or out of registration with said hub section, means for locking said member in its registered or non-registered positions, and a removable hub section carried by the wheel and having a tapered non-circular bore conforming to the shape of the first hub section, said removable hub section being capable of application to or removal from the first section when the rotary member is registered therewith and adapted to be retained thereon by said member when the same is out of registration with said first section.

HENRY EASTON HOLLEY.